United States Patent [19]

Schulz

[11] Patent Number: 4,582,235

[45] Date of Patent: Apr. 15, 1986

[54] AUTOMATIC TAPE TRACKING SYSTEM FOR MAGNETIC RECORDER/PLAYERS

[75] Inventor: Gordon R. Schulz, Villa Park, Calif.

[73] Assignee: Odetics, Inc., Anaheim, Calif.

[21] Appl. No.: 621,212

[22] Filed: Jun. 15, 1984

[51] Int. Cl.⁴ .......................................... B65H 25/10
[52] U.S. Cl. ..................................... 226/20; 226/45; 226/197; 242/186
[58] Field of Search ....................... 226/19, 20, 21, 22, 226/23, 3, 45, 196, 197; 242/186

[56] References Cited

U.S. PATENT DOCUMENTS

| | | | |
|---|---|---|---|
| 1,791,288 | 2/1931 | Schweitzer | 226/21 X |
| 2,203,706 | 6/1940 | Stockbarger | 226/20 |
| 2,332,104 | 10/1943 | Meyer | 226/20 |
| 2,630,319 | 3/1953 | Heilman et al. | 226/21 |
| 2,938,962 | 5/1960 | Konins et al. | 226/19 X |
| 3,017,062 | 1/1962 | Watt et al. | 226/21 X |
| 3,096,919 | 7/1963 | Snyder | 226/20 X |
| 3,244,340 | 4/1966 | Fife et al. | 226/22 |
| 3,300,114 | 1/1967 | Jacobsen | 226/19 X |
| 3,390,823 | 7/1968 | Ott, Jr. | 226/19 |
| 3,764,087 | 10/1973 | Paananen et al. | 242/186 |
| 4,303,189 | 12/1981 | Wiley et al. | 226/21 X |
| 4,349,849 | 9/1982 | Satoh | 226/3 X |

Primary Examiner—Harvey C. Hornsby
Attorney, Agent, or Firm—Spensley Horn Jubas & Lubitz

[57] ABSTRACT

An automatic tape tracking system for magnetic recorder/players which samples tape position and adjusts a number of active guide rollers to maintain the tape along a predetermined track. The present system uses only perfectly cylindrical rollers and requires no edge guiding. The guide rollers are adjustable in height and to change the direction of their axes. Both adjustments are effected with the use of linear stepper motors. The tape position is monitored at various locations throughout the recorder/player by cameras which monitor the position of the edge of the tape. Output signals from the cameras are fed to a microprocessor which controls the stepper motors. Height adjustments are made to instantaneously correct tape position and tilt adjustments are made to allow the guide rollers to remain, in height, in a neutral zone.

10 Claims, 6 Drawing Figures

AUTOMATIC TAPE TRACKING SYSTEM FOR MAGNETIC RECORDER/PLAYERS

BACKGROUND OF THE INVENTION

1. Field of the Invention

The present invention relates to an automatic tape tracking system for magnetic recorder/players and, more particularly, to an automatic system for tracking the lateral position of magnetic tape and adjusting such lateral position to maintain the tape along a predetermined track.

2. Description of the Prior Art

There is always a need for magnetic recorders which can store greater quantities of data at ever increasing data rates. To accomplish this, it is necessary to use wider tape, faster tape speeds and a higher data density (more bits of data per inch of tape). As tape becomes wider and wider, a limiting factor has been the difficulty in guiding the path of the tape through the tape handling system and across the magnetic record/reproduce heads.

By way of example, in developing a magnetic tape handling system for use in an outer space environment, it is presently being proposed to have track widths on the order of 2 mils with a similar spacing between each track. This provides the potential of 600-800 individual tracks across the width of one inch tape. Systems are presently available for use in ground stations for recording 300 megabits of data per second. It can be well appreciated that in handling data having such a density, it is necessary to accurately guide the path of the tape across the heads if the heads are going to remain accurately aligned with the individual data tracks.

Historically, the typical means of guiding tape is either through the use of crown rollers or a fixed edge guidance systems. In the latter approach, flanges forcibly constrain the tape. The problem is that forcibly constraining the tape limits the life thereof. That is, the edges of the tape deteriorate over time and the tape must be replaced. While this does not necessarily present a problem in a ground station, it certainly presents a problem where a system is designed for space application where it will operate over many years without maintenance.

Using crown rollers eliminates the edge flanges, but replaces then with a technique whereby non-uniform stresses are induced across the face of the tape. As tape widths increase, the non-uniform stress must also increase to effect the proper tape tracking performance. The long term presence of non-uniform stresses in the tape results in permanent deformation of the tape. This deformation can alter track-to-track spacing, further complicating the problem of tracking and leading to increased data errors. In addition, the tape deformation limits tape life.

SUMMARY OF THE INVENTION

According to the present invention, there is provided an automatic tape tracking system for magnetic tape handling systems which eliminates these problems and permits greater quantities of data to be stored at increasing data rates. The present system is a computer controlled, electromechanical means for sampling tape position and adjusting a number of active guide rollers to maintain the tape along a predetermined track. The present system uses only perfectly cylindrical (crownless) rollers and requires no edge guiding. Therefore, there are no non-uniform stresses induced in the tape. In addition, the present system can greatly reduce or eliminate end-to-end shifts in tape position, modulation in tracking, and the shift in tape position usually associated with a change in tape direction.

The present invention achieves the above by using, along the tape path, a plurality of guide rollers that can be adjusted in two ways. First, the guide rollers can be adjusted in height (axially) and this is re-referred to herein as a "pogo" adjustment. Secondly, the guide rollers can be adjusted to change the direction of their axes and this is referred to herein as a "tilt" adjustment. Each tiltable guide roller can be adjusted in one plane, although the orientation of this plane to the plane of the tape can vary from roller to roller. Some guide rollers tilt in the plane of the tape whereas others tilt in a plane perpendicular to the plane of the tape.

Both the tilt and pogo adjustments are effected with the use of linear stepper motors. The tape position is monitored at various locations throughout the recorder/player by cameras which monitor the position of the edge of the tape. Output signals from the cameras are fed to a microprocessor which controls the linear stepper motors. Pogo adjustments are made to instantaneously correct tape position. As the rollers move up and down to correct tape position, tilt adjustments are made to allow the guide rollers to remain, in pogo, in a neutral zone.

Briefly, in a magnetic tape handling system wherein a length of magnetic tape extends from a supply reel past a plurality of guide rollers, at least one capstan and at least one magnetic head to a take-up reel, there is disclosed a system for tracking the lateral position of the tape and adjusting the lateral position to maintain the tape along a predetermined track comprising a plurality of guide roller modules, each module including a first frame member for supporting a guide roller for limited axial movement for moving the tape laterally, a first linear motor for moving the guide roller axially, a second frame member for supporting the first frame member for limited pivotal movement for moving the tape laterally and a second linear motor for tilting the first frame member relative to the second frame member, the system further comprising a camera for sensing the lateral position of the tape and control means responsive to the camera for activating the first linear motor to move the tape in the direction of the predetermined track and responsive to axial movement of the guide roller for activating the second linear motor to maintain the axial position of the guide roller in a neutral zone.

OBJECTS, FEATURES AND ADVANTAGES

It is therefore the object of the present invention to solve the problems associated with guiding the path of magnetic tape through a magnetic recorder/player. It is a feature of the present invention to solve these problems by providing a computer-controlled electromechanical system for sampling tape position and adjusting a number of active guide rollers to maintain the tape along a predetermined track. An advantage to be derived is the elimination of fixed edge guidance systems. A further advantage is the elimination of crown rollers. A still further advantage is the elimination of non-uniform stresses in magnetic tape. Another advantage is in the ability to store great quantities of data at high data rates. Still another advantage is a great reduction in end-to-end shifts in tape position. Another advantage is an elimination of modulation in tape tracking. Still another advantage is an elimination of the shift in tape position usually associated with a change in tape direction.

Still other objects, features and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

DESCRIPTION OF THE PREFERRED EMBODIMENT

Figure 1:
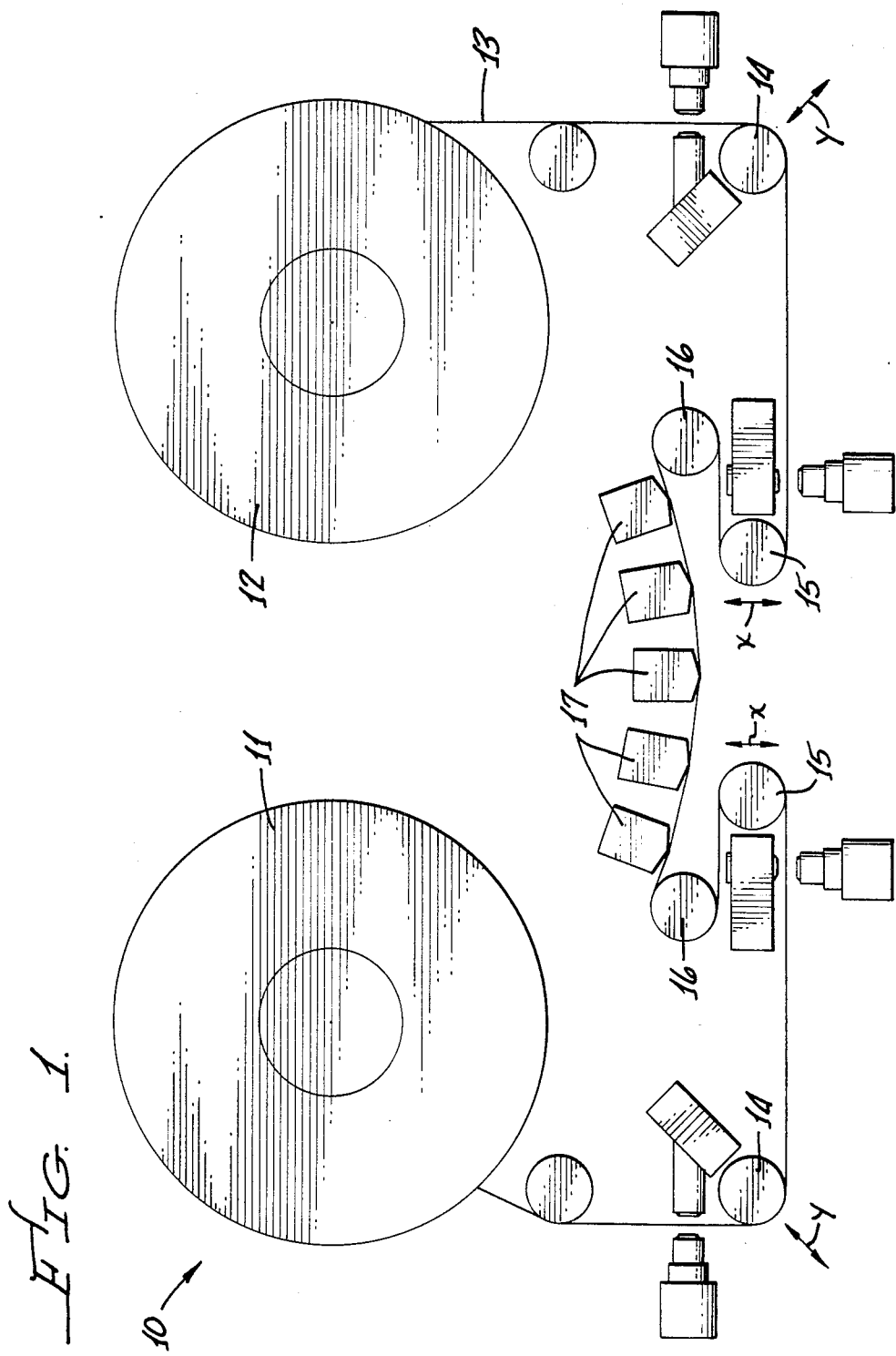
FIG. 1 is a top plan view of a magnetic recorder/player incorporating the present automatic tracking system.

Referring now to the drawings and, more particularly, to FIG. 1 thereof, there is shown a magnetic recorder/player, generally designated 10, which is suitable for illustrating the principles of the present invention. That is, recorder/player 10 includes a pair of tape reels 11 and 12, between which and wound thereon extends a length of magnetic tape 13. One of reels 11 and 12 is a supply reel and the other is a take-up reel, depending upon the direction of movement of tape 13. This direction may be reversed. Between reels 11 and 12 are a plurality of guide rollers 14 and 15 which conduct tape 13 to a pair of drive capstans 16, between which are positioned one or more magnetic record/reproduce heads 17. This general type of arrangement is well known to those skilled in the art.

According to the present invention, guide rollers 14 and 15 can be adjusted in two ways. First, both guide rollers 14 and 15 can be adjusted in heigth (axially) and this is referred to herein as a "pogo" adjustment. Secondly, guide rollers 14 and 15 can be adjusted to change the direction of their axes and this is referred to herein as a "tilt" adjustment. Each tiltable guide roller 14 and 15 can be adjusted in one plane, although the orientation of this plane varies from roller to roller. As used herein, the "plane of the tape" means the plane of the tape at the midpoint of its wrap angle. In the case of guide rollers 14, the wrap angle is 90° and in the case of guide rollers 15, the wrap angle is 180°. Guide rollers 15 tilt in the plane of the tape, as shown by arrows X, and guide rollers 14 tilt in a plane perpendicular to the plane of the tape, as shown by arrows Y.

Figure 2:
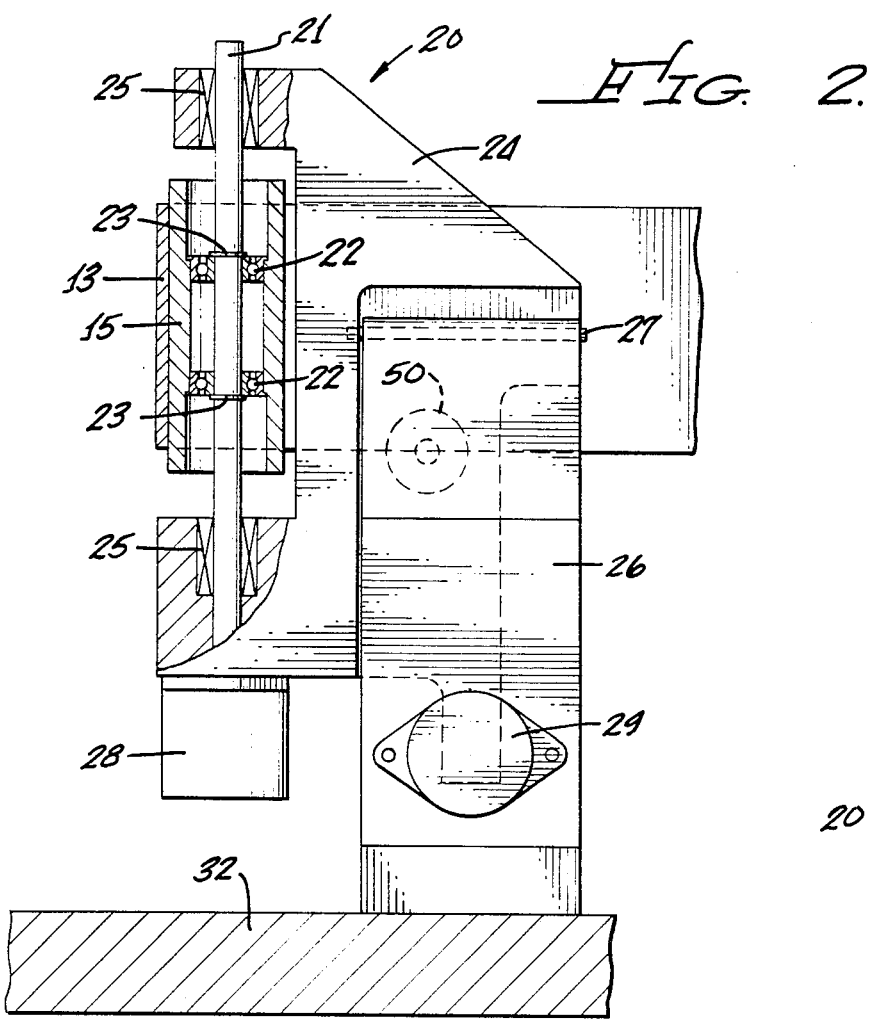
FIGS. 2 and 3 are side elevation views of a first embodiment of guide roller module.
Figure 3:
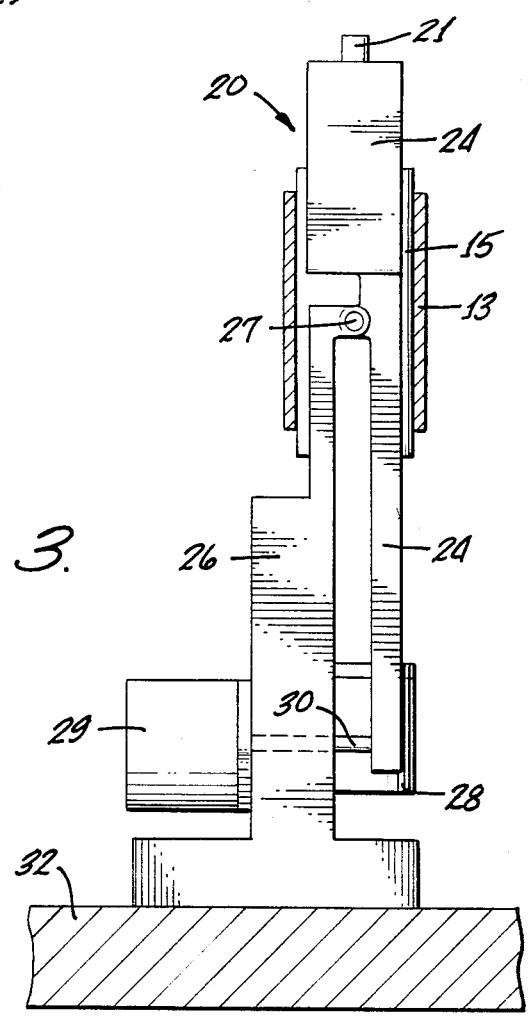

Guide rollers 15 are part of identical guide roller modules, generally designated 20, which may be best understood with reference to FIGS. 2 and 3. That is, each guide roller 15 is mounted for rotation on a shaft 21 by means of bearings 22. Guide roller 15 is fixed to shaft 21 in the axial direction by means of rings 23 secured to shaft 21. Shaft 21 is supported by a pivoting frame 24 which supports a pair of bearings 25 through which shaft 21 extends. Bearings 25 permit axial travel of shaft 21. Pivoting frame 24 is attached to a stationary frame 26 by means of a pivot pin 27. As can be seen in FIG. 3, pivot pin 27 permits pivoting of frame 24 relative to frame 26 about the axis of pin 27. Stationary frame 26 is positioned on a mounting frame 32.

A first stepper motor 28 is mounted on pivoting frame 24 and a second stepper motor 29 is mounted on stationary frame 26. Shaft 21 is the output shaft of stepper motor 28 whereas stepper motor 29 has an output shaft 30. Output shafts 21 and 30 of stepper motors 28 and 29, respectively, do not rotate but move axially. The free end of shaft 30 engages pivoting frame 24.

It can therefore be seen that activation of stepper motor 28 causes axial movement of shaft 21 and a pogo adjustment of guide roller 15. Similarly, activation of stepper motor 29 causes pivotal movement of frame 24 about pin 27 and a tilt adjustment of guide roller 15. It should be particularly noted that guide roller 15 is a cylindrical tape spool, not a crown roller and not having any edge flanges.

Figure 4:
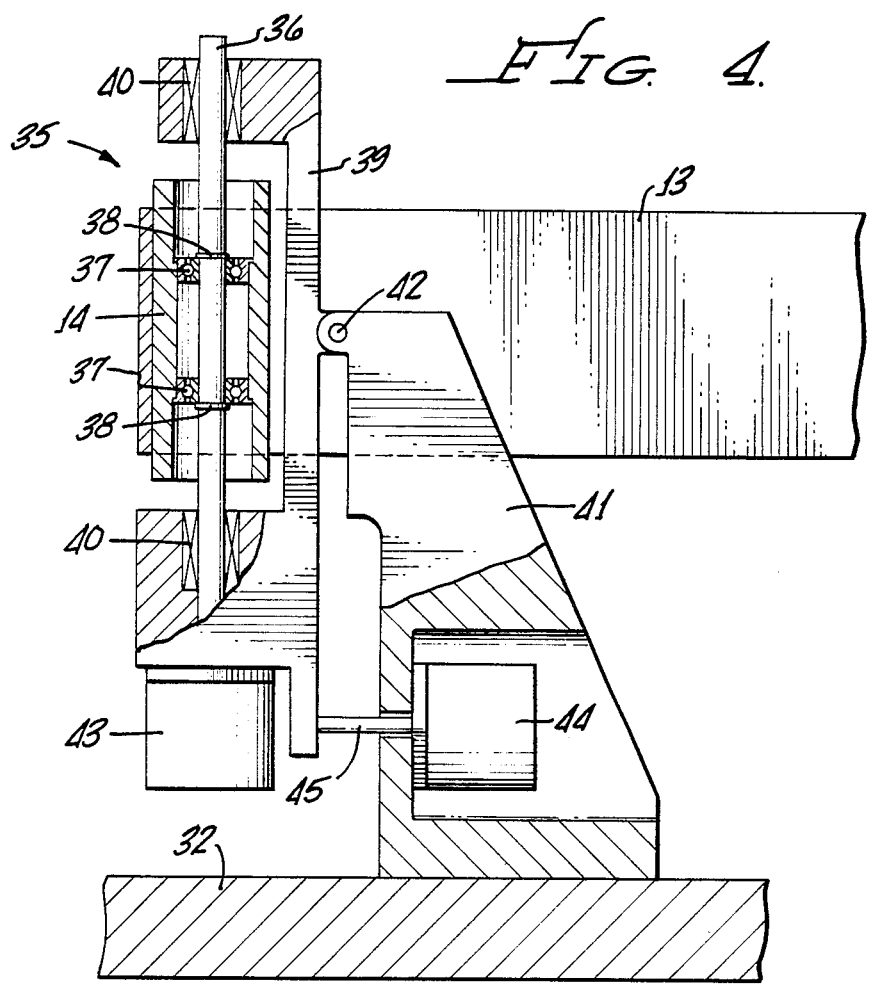
FIG. 4 is a side elevation view of a second embodiment of guide roller module.

In a similar manner, guide rollers 14 are part of identical guide roller modules, generally designated 35, which may be best understood with reference to FIG. 4. That is, each guide roller 14 is mounted for rotation on a shaft 36 by means of bearings 37. Guide roller 14 is fixed to shaft 36 in the axial direction by means of rings 38 secured to shaft 36. Shaft 36 is supported by a pivoting frame 39 which supports a pair of bearings 40 through which shaft 36 extends. Bearings 40 permit axial travel of shaft 36. Pivoting frame 39 is attached to a stationary frame 41 by means of a pivot pin 42. As can be seen in FIG. 4, pivot pin 42 permits pivoting of frame 39 relative to frame 41 about the axis of pin 42. Stationary frame 41 is positioned on mounting frame 32.

A first stepper motor 43 is mounted on pivoting frame 39 and a second stepper motor 44 is mounted on stationary frame 41. Shaft 36 is the output shaft of stepper motor 43 whereas stepper motor 44 has an output shaft 45. Output shafts 36 and 45 of stepper motors 43 and 44, respectively, do not rotate but move axially. The free end of shaft 45 engages pivoting frame 39.

It can therefore be seen that activation of stepper motor 43 causes axial movement of shaft 36 and a pogo adjustment of guide roller 14. Similarly, activation of stepper motor 44 causes axial movement of shaft 45, pivotal movement of frame 39 about pin 42 and a tilt adjustment of guide roller 14. It should be particularly noted that guide roller 14 is a cylindrical tape spool, not a crown roller, and has no edge flanges.

According to the preferred embodiment of the invention, each linear stepper motor can step 255 steps, with each step being 2 mils. By proper design of the computer interface to the stepper motors used for each pogo adjustment, each step can be broken down into a number of microsteps, 16 in the preferred embodiment. This permits pogo resolution of $\frac{1}{8}$ of a mil.

Figure 5:
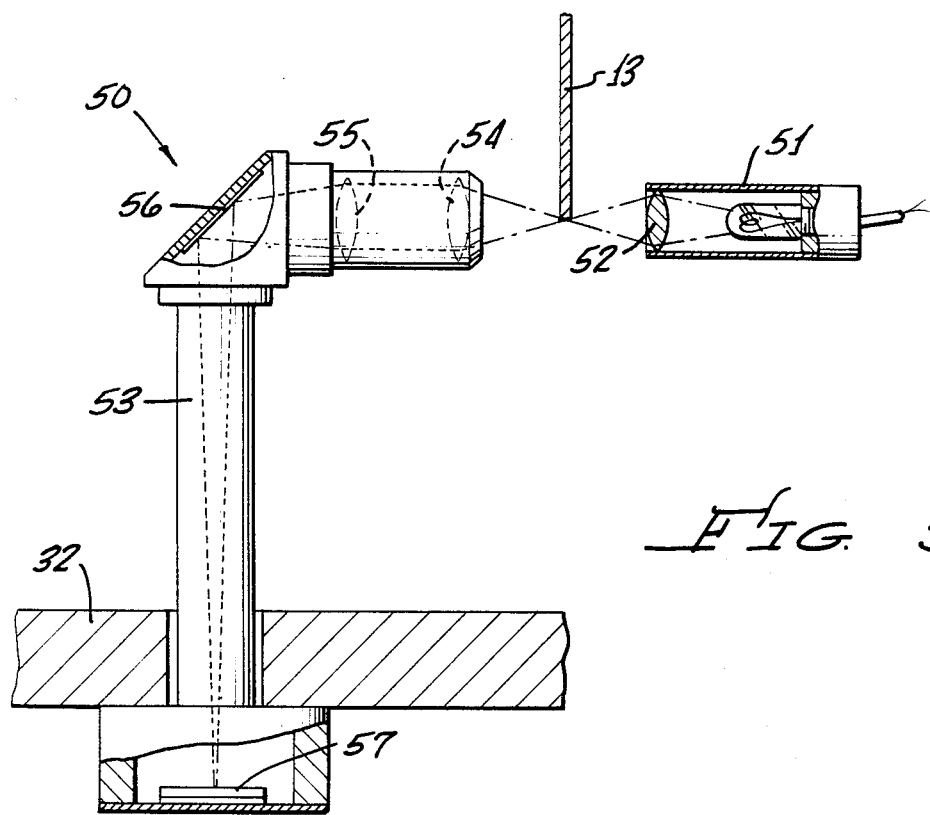
FIG. 5 is a side elevation view of the tape edge sensing system.

Referring now to FIGS. 1 and 5, the position of tape 13 is monitored at various locations throughout recorder/player 10 by means of a plurality of cameras, generally designated 50, which sense the edge of tape 13. Each camera 15 includes a light source 51 and a lens 52 on one side of tape 13, the focal point of lens 52 being the desired position of the edge of tape 13. Mounted on the other side of tape 13 is a housing 53 positioned within mounting frame 32. Housing 53 functions as a periscope, having a pair of lenses 54 and 55 which project the image of the edge of tape 13 on a 45° mirror 56 which conveys this image to an optical sensor 57.

Optical sensor 57 is preferably a Reticon line scanner which is a charge coupled device that includes 255 pixels (light emitting diodes) in a linear array. The preferred length of the total array is ¼ inch. Since the image of the tape edge is focused on the line scanner, some of the pixels will receive light while others will be shaded by the tape. In a preferred embodiment, the pixels are spaced by 1 mil. The optics are designed so as to give a 3-to-1 multiplication so that optical sensor 57 produces, in effect, a resolution of ⅓ of a mil. That is, for every ⅓ of a mil movement of the edge of tape 13, one more pixel will be uncovered. Thus, optical sensor 57 provides an electrical output which is directly related to the position of the edge of tape 13.

In operation, if the tape position is other than normal, one or more of the optical sensors 57 transmit a signal to a microprocessor, to be described more fully hereinafter, to control the appropriate pogo stepper motor 28 or 43 to immediately correct the tape position. The tilt system monitors the pogo adjustments. This is done by tracking the pogo stepper motor counts using the microprocessor and its associated electronics. If the pogo motor is not in its neutral position (i.e., the tape location is not at its nominal position), the tilt angle will be modified by one of the tilt stepper motors 29 or 44. The tilt angle correction causes an instantaneous tracking misalignment between the tape tramming direction and the guide roller. This misalignment action causes tape 13 to traverse up or down on the appropriate guide roller in an axial direction. As tape 13 traverses on the guide roller, a pogo adjustment is simultaneously made to reposition tape 13 to maintain its nominal tracking location. These two interacting functions operate to evolve to a state of equilibrium where the dynamics between the pogo and tilt adjustments are minimal.

From the above, a microprocessor for controlling stepper motors 28, 29, 43 and 44 to achieve tracking of tape 13 will be evident to those skilled in the art. The following is a functional description of a preferred embodiment, showing a typical application, and is not intended in a limiting sense.

Figure 6:
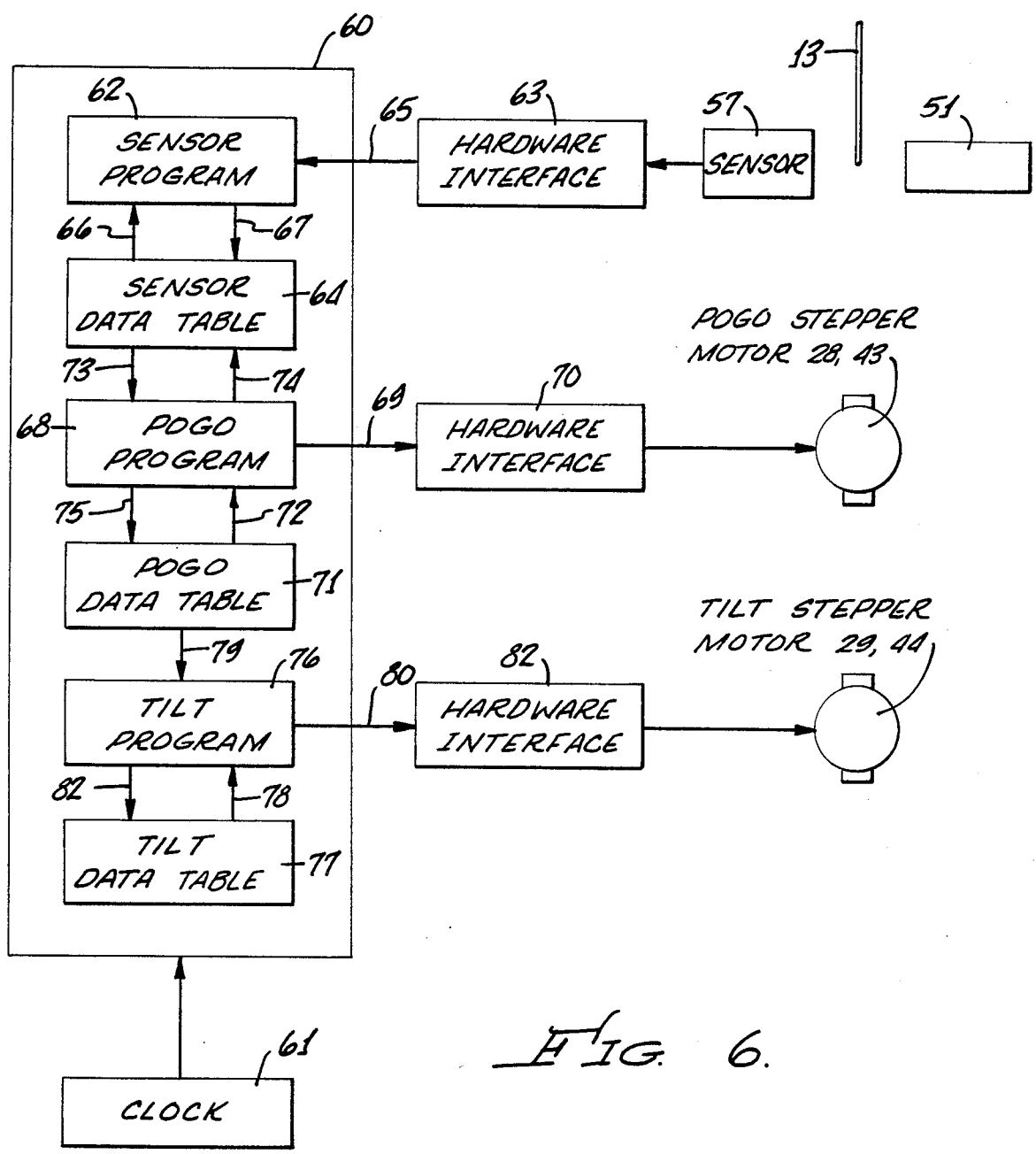
FIG. 6 is a functional block diagram of the computer portion of the present automatic tape tracking system.

Referring now to FIG. 6, there is shown a functional block diagram of a suitable microprocessor, generally designated 60, shown in block diagram form. The timing of the system is controlled by an external clock 61. During each cycle from clock 61, all of sensors 57 are interrogated and all pogo stepper motors 28 and 43 and all tilt stepper motors 29 and 44 are adjusted. A typical clock cycle time is 5 milliseconds, meaning adjustments are made 200 times per second. Each clock cycle entails the performance of the following steps.

Microprocessor 60 includes a sensor program which, through a hardware interface 63, interrogates each sensor 57 to determine current tape 13 position. Sensor program 62 maintains a data table 64 for each sensor 57, which data table 64 contains the data pertinent to each individual sensor. Sensor program 62 reads (over a line 65) the current positions from sensors 57 and then obtains (over line 66) the desired sensor positions from sensor data table 64. A tape position error is calculated and stored back into sensor data table 64 (over line 67).

As mentioned previously, pogo adjustments are made to correct for instantaneous errors in tape position. Since the pogo travel at each adjustment is limited, sudden large errors in tape position may not be completely eliminated in a single clock cycle. In any event, microprocessor 60 includes a pogo program 68 for signalling pogo stepper motors 28 and 43 via lines 69 and hardware interface 70 for making the appropriate instantaneous corrections. Pogo program 68 maintains a data table 71 for each pogo stepper motor, data table 71 containing the data pertinent to each individual pogo stepper motor. Pogo program 68 calls, for each clock cycle, the program for each pogo stepper motor and, when the pogo program is called, program 68 checks (over line 72) pogo data table 71 to see which sensor 57 is controlling the individual pogo stepper motor. Pogo program 68 then checks the current error for that sensor (over line 73) and, based on the current error, decides how to move the appropriate pogo stepper motor 28 or 43. The type of move is transmitted (over line 75) to pogo data table 71 for storage. Since hardware interface 70 provides no position feedback to program 68 for the current pogo position, pogo program 68 must keep track of the movement of each pogo stepper motor. The current pogo position is adjusted based on the move to be made and the resulting position is stored in pogo data table 71. Pogo program 68 also calculates an indicator of the general trend of the pogo movement. This indicator is also stored in pogo data table 71 for later use in adjusting the tilt. Then, pogo program 68 instructs hardware interface (over line 69) to cause the appropriate pogo stepper motor to make the desired correction. As explained previously, the pogo stepper motor moves in ⅛ mil microsteps. Pogo program 68 can preferably move the appropriate motor up or down from 1 to 16 microsteps during each clock cycle.

Microprocessor 60 also contains a tilt program 76. Tilt program 76 is designed to adjust the tilt stepper motors 29 and 44 so that the pogo stepper motors 28 and 43 will not run out of travel. Tilt program 76 tends to compensate for any long term drift of tape 13 on guide rollers 14 and 15. Accordingly, tilt program 76 maintains a data table 77 for each tilt stepper motor, data table 77 containing the data pertinent to an individual tilt. Tilt program 76 will check (over line 78) tilt data table 77 to identify the pogo stepper motor for which it is to act. Tilt program 76 obtains (over line 79) from pogo data table 71 information on the general trend of movement of the pogo stepper motors 28 and 43. If the trend indicates that tape 13 is drifting on a particular guide roller 14 or 15, tilt program 76 will (over line 80) and via hardware interface 82 adjust the appropriate tilt stepper motor 29 or 44 to correct for that drift. The type of move for the tilt is calculated and the move type and new position of the tilt stepper motor is stored (via line 83) into tilt data table 77. Again, the actual position of the tilt stepper motors 29 and 44 is not available to tilt program 76 so program 76 must keep track of how it has adjusted each tilt stepper motor 29 and 44. Tilt program 76 then instructs hardware interface 82 to move the tilt stepper motor. Each tilt stepper motor moves only in 2 mil increments. Tilt program 76 can move a tilt stepper motor up or down one increment during each clock cycle.

There are two elements of tilt adjustment. There is a quick component and a slow component. The quick component will adjust the tilt if the trend of movement of a pogo is quickly and continuously moving in one direction. This component of tilt in effect anticipates the continued movement of the pogo and tries to compensate for that. The slow component of tilt movement, on the other hand, is used to keep each pogo stepper motor 28 and 43 at its center of travel.

The slow adjustment is made only about every 50 clock cycles. As mentioned previously, a clock cycle is typically 5 milliseconds. Thus, about every 50 clock cycles, or 250 milliseconds, the position of each pogo is checked. If the pogo is not in its nominal position, a tilt adjustment will be made for bringing the pogo towards its nominal position. Since only one adjustment is possible within a single clock cycle, the quick adjustment is given priority over the slow adjustment. The slow adjustment will only be performed if the quick adjustment is not to be made during that clock cycle.

It can therefore be seen that according to the present invention, there is provided an automatic tape tracking system for magnetic recorder/player 10 which eliminates the problems encountered heretofore and permits greater quantities of data to be stored and increasing data rates. The present automatic tracking system samples tape position and adjusts a number of active guide rollers 14 and 15 to maintain tape 13 along a predetermined track. The present system uses only perfectly cylindrical (crownless) rollers and requires no edge guiding. Therefore, there are no nonuniform stresses induced in tape 13. In addition, the present system can greatly reduce or eliminate end-to-end shifts in tape position, modulation and tracking, and the shift in tape position usually associated with a change in tape direction.

The above is achieved by the use of a plurality of guide rollers along the tape path that can be adjusted in pogo and tilt. Both the tilt and pogo adjustments are effected with the use of linear stepper motors. The tape position is monitored at various locations throughout the recorder by cameras which monitor the position of the edge of the tape. As shown in FIG. 1, a camera is positioned adjacent each guide roller module and, in the simplest embodiment of the present invention, each sensor is used to adjust its associated guide roller module. In more complex embodiments of the present invention, tape edge sensors positioned along the tape path can be used to adjust guide roller modules at physically displaced locations.

Output signals from the tape edge sensors are fed through a microprocessor which controls the linear stepper motors of the guide roller modules. Pogo adjustments are made to instantaneously correct tape position. Tilt adjustments are made to correct for the movement of the guide rollers in pogo to maintain such guide rollers in a neutral zone.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. In a magnetic tape handling system wherein a length of magnetic tape extends from a supply reel, past a plurality of guide rollers, at least one capstan and at least one magnetic head to a takeup reel, a system for tracking the lateral position of said tape and adjusting said lateral position to maintain said tape along a predetermined track comprising:
    a plurality of guide roller modules, each including:
        frame means for supporting one of said guide rollers for limited axial and pivotal movement; and
        first drive emans for axially moving and second drive means for tilting each of said guide rollers wherein said drive means comprise linear stepper motors;
    means for sensing the lateral position of said tape; and
    control means responsive to said sensing means for activating said drive means to maintain the lateral position of said tape along said predetermined track.

2. A tape position tracking system according to claim 1, further comprising:
    a plurality of said sensing means, one for each of said guide roller modules.

3. A tape position tracking system according to claim 1, wherein said frame means comprises:
    first frame means for supporting said one of said guide rollers for limited axial movement; and
    second frame means for supporting said first frame means for pivotal movement.

4. A tape position tracking system according to claim 3, wherein:
    said first drive means is operatively mounted on said first frame means for moving said guide roller axially; and
    said second drive means is operatively positioned between said first and second frame means for tilting said first frame means relative to said second frame means.

5. In a magnetic tape handling system wherein a length of magnetic tape extends from a supply reel, past a plurality of guide rollers, at least one capstan and at least one magnetic head to a takeup reel, a system for tracking the lateral position of said tape and adjusting said lateral position to maintain said tape along a predetermined track comprising:
    a plurality of guide roller modules, each including:
        frame means for supporting one of said guide rollers for limited axial and pivotal movement; and
        first drive means for axially moving each of said guide rollers;
    second drive means for tilting each of said guide rollers;
    means for sensing the lateral position of said tape; and
    control means responsive to said sensing means for activating said drive means to maintain the lateral position of said tape along said predetermined track, wherein said control means is responsive to said sensing means for activating said first drive means to move said tape in the direction of said predetermined track and is further responsive to axial movement of said guide roller for activating said second drive means to maintain the axial position of said guide roller in a neutral zone.

6. A tape position tracking system according to claim 5, wherein the wrap angle of said tape around at least one of said guide roller modules is 90° and wherein said second frame means supports said first frame means for tilting of said guide roller in a plane perpendicular to the plane of said tape, the plane of the tape being the plane of the tape at the midpoint of its wrap angle.

7. A tape position tracking system according to claim 6, wherein the wrap angle of said tape around at least another one of said guide roller modules is 180° and wherein said second frame means supports said first frame means for tilting of said guide roller in the plane of said tape, the plane of the tape being the plane of the tape at the midpoint of it wrap angle.

8. A tape position tracking system according to claim 5, wherein the wrap angle of said tape around at least one of said guide roller modules is 180° and wherein said second frame means supports said first frame means for tilting of said guide roller in the plane of said tape, the plane of the tape being the plane of the tape at the midpoint of its wrap angle.

9. A tape position tracking system according to claim 1, a system wherein said sensing means comprises:
   optical sensor means for sensing the location of the edge of said tape and for generating an electrical signal proportional thereto.

10. A tape position tracking system according to claim 9, wherein said sensing means further comprises:
   a light source and first lens means positioned on one side of said tape, the focal point of said first lens means being the desired position of said edge of said tape; and
   second lens means positioned on the other side of said tape for projecting the image of the edge of said tape on said optical sensor means.

* * * * *